US010824863B2

(12) United States Patent
Kanehara et al.

(10) Patent No.: US 10,824,863 B2
(45) Date of Patent: Nov. 3, 2020

(54) SYSTEMS FOR SEARCHING FOR PERSONS USING AUTONOMOUS VEHICLES

(71) Applicant: Toyota Jidosha Kabushiki Kaisha, Toyota (JP)

(72) Inventors: Isao Kanehara, Miyoshi (JP); Kazuhiro Umeda, Nisshin (JP); Hideo Hasegawa, Nagoya (JP); Tsuyoshi Okada, Toyota (JP); Shinjiro Nagasaki, Tokyo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/225,622

(22) Filed: Dec. 19, 2018

(65) Prior Publication Data

US 2019/0197859 A1 Jun. 27, 2019

(30) Foreign Application Priority Data

Dec. 26, 2017 (JP) .................................. 2017-249853

(51) Int. Cl.
*G06K 9/00* (2006.01)
*B64C 39/02* (2006.01)
*G08B 21/02* (2006.01)

(52) U.S. Cl.
CPC ........ *G06K 9/00664* (2013.01); *B64C 39/024* (2013.01); *G06K 9/00369* (2013.01); *B64C 2201/127* (2013.01); *G08B 21/0269* (2013.01)

(58) Field of Classification Search
None
See application file for complete search history.

(56) References Cited

U.S. PATENT DOCUMENTS

| 10,152,053 B1* | 12/2018 | Smith ............... G01C 21/3438 |
| 10,233,021 B1* | 3/2019 | Brady ...................... G06Q 50/30 |
| 10,242,665 B1* | 3/2019 | Abeloe ............... G06N 3/0454 |
| 10,599,150 B2* | 3/2020 | Graham ............... G01S 13/931 |
| 2017/0135277 A1* | 5/2017 | Hiramatsu ........... G05D 1/0278 |
| 2018/0158197 A1* | 6/2018 | Dasgupta .................. G06T 7/11 |
| 2018/0189574 A1* | 7/2018 | Brueckner ........... G06K 9/2081 |
| 2018/0349785 A1* | 12/2018 | Zheng ...................... G06N 5/02 |
| 2019/0128694 A1* | 5/2019 | Matsushita ............ G08G 1/005 |
| 2019/0236955 A1* | 8/2019 | Hu ........................ G05D 1/0022 |
| 2019/0324459 A1* | 10/2019 | Baalke ................. G05D 1/0276 |
| 2019/0327124 A1* | 10/2019 | Lai ...................... H04L 25/0204 |
| 2020/0012286 A1* | 1/2020 | Delp .................... G05D 1/0214 |
| 2020/0023842 A1* | 1/2020 | Gutierrez .......... B60W 30/0956 |

FOREIGN PATENT DOCUMENTS

JP 2015092320 A 5/2015
JP 2015102960 A 6/2015

* cited by examiner

*Primary Examiner* — Tyler W. Sullivan
(74) *Attorney, Agent, or Firm* — Dinsmore & Shohl LLP

(57) ABSTRACT

A system includes an autonomous vehicle that has a camera for capturing an image and a GPS receiver for acquiring positional information and moves according to a specific operation command, and a controller. The controller creates an operation command sent to the autonomous vehicle, detects a human image in the image captured by the camera, and make a determination as to whether or not the human image detected in the image is an image of a searched object.

8 Claims, 7 Drawing Sheets

SYSTEMS FOR SEARCHING FOR PERSONS USING AUTONOMOUS VEHICLES

CROSS REFERENCE TO RELATED APPLICATION

This application claims the benefit of Japanese Patent Application No. 2017-249853, filed on Dec. 26, 2017, which is hereby incorporated by reference herein in its entirety.

BACKGROUND

Technical Field

The present disclosure relates to a person search system.

Description of the Related Art

It is known in prior art to detect wanderers (e.g. persons with dementia) or lost children using images captured by surveillance cameras. For example, Patent Literature 1 in the following list discloses a technology of finding a lost child by detecting persons in images captured by surveillance cameras set in an amusement park or the like and comparing them with registered information of the lost child.

CITATION LIST

Patent Literature

Patent Literature 1: Japanese Patent Application Laid-Open No. 2015-102960
Patent Literature 2: Japanese Patent Application Laid-Open No. 2015-092320

SUMMARY

In the system disclosed in Patent Literature 1, detection of persons relies on surveillance cameras set in an amusement park or the like. Therefore, it is not possible to detect a wanderer or a lost child to be found, if he or she is not present in the image capturing areas of the surveillance cameras.

There are known autonomous driving traffic systems including autonomous driving mobile objects that communicate with each other via a network, as described in Patent Literature 2. However, such traffic systems have not been utilized to detect searched objects.

The present disclosure has been made in view of the above circumstances. An object of the present disclosure is to provide a technology used to detect searched objects by using a system including mobile objects.

According to the present disclosure, there is provided a person search system. The person search system includes an autonomous mobile object that has a camera for capturing an image and a GPS receiver for acquiring positional information and configured to move according to a specific operation command; and a controller configured to: create said operation command sent to said autonomous mobile object; detect a human image in said image; and make a determination as to whether or not said human image detected in said image is an image of a searched object that satisfies a specific search condition.

The autonomous mobile object is a mobile object that moves autonomously on the basis of a specific operation command. The autonomous mobile object may be an autonomous vehicle. The operation command is information including, for example, information about a destination and/or a travel route and information about a service to be provided by the autonomous mobile object on the route. For example, in the case where the autonomous mobile object is intended for transportation of passengers and/or goods, the operation command may be a command that causes the autonomous mobile object to transport passengers and/or goods along a predetermined route. In the case where the autonomous mobile object is intended for transportation of a shop, facility, or equipment, the operation command may be a command that causes the autonomous mobile object to travel to a certain destination, and prepare the shop, facility, or equipment for service at that place.

The present disclosure is characterized by using such an autonomous mobile object for the purpose of detecting a searched object.

The person search system includes controller for creating the aforementioned operation command, detecting a human image in a captured image, and determining whether or not the detected human image is an image of a searched object. The controller may be provided in a server apparatus that can communicate with the autonomous mobile object or in the autonomous mobile object.

The system having the above configuration enables quick and accurate detection of a wanderer using images captured by the autonomous mobile object under operation.

The aforementioned person search system may employ various methods to detect a person in an image.

For example, the person search system may further comprise a storage medium, and the controller may make the determination on the basis of information about said searched object stored in said storage medium in advance and said human image.

Alternatively, said controller may detect said human image in each of a plurality of said images, and said controller may make said determination on the basis of a plurality of said human images that are images of the same person.

Still alternatively, the person search system may further comprise a user interface through which a user can input information, and said controller may make said determination on the basis of an input made through said user interface.

As above, various detection methods are available. Therefore, a method suitable for the actual configuration of the system may be employed or two or more methods may be employed in combination to improve accuracy of detection.

After detecting the searched object using an image(s) captured by the autonomous mobile object, the operation of the person search system shifts to discovery and protection of the searched object. When the searched object is to be protected, the person search system may let the searched object to get on the autonomous mobile object.

When the searched object is to be discovered, if said person search system includes a plurality of said autonomous mobile objects, the system may determine an area or route in or along which said autonomous mobile object is to travel to discover said person, on the basis of positional information of said plurality of autonomous mobile objects.

According to the present disclosure, there can also be provided a person search system including at least one or more of the above-described means. According to another aspect of the present disclosure, there is provided a method carried out by the above-described person search system. The processing and means described above may be employed in any combinations, if technically feasible.

The present disclosure can provide a technology that enables quick detection of a searched object using a system including a mobile object.

DESCRIPTION OF EMBODIMENTS

In the following, modes for carrying out the present disclosure will be specifically described as illustrative embodiments with reference to the drawings. The dimensions, materials, shapes, relative arrangements, and other features of the components that will be described in connection with the embodiments may be changed suitably depending on the structure of apparatuses to which the present disclosure is applied and other conditions. In other words, the following embodiments are not intended to limit the technical scope of the present disclosure.

First Embodiment

<Outline of the System>

The outline of a person search system according to a first embodiment will be described with reference to FIG. 1. The person search system according to the first embodiment includes a plurality of autonomous vehicles 100A, 100B, 100C, . . . 100n that can run autonomously on the basis of commands given thereto and a server apparatus 200 that issues the commands. In the following, the autonomous vehicles will be collectively referred to as autonomous vehicles 100, when it is not necessary to distinguish individual vehicles. The autonomous vehicles 100 are self-driving vehicles that provide predetermined services. The server apparatus 200 is an apparatus that performs management of the plurality of autonomous vehicles 100.

The autonomous vehicles 100 are multipurpose mobile objects that may have individually different functions. Typically the autonomous vehicles 100 are vehicles that can travel on the road autonomously without a human driver. Examples of the autonomous vehicles 100 include vehicles that travel along a predetermined route to pick up and drop off persons, on-demand taxis that operate on users' demand, and mobile shops that enable shop operation at a desired destination. In the case where the autonomous vehicles 100 are intended for transportation of passengers and/or goods, they may transport passengers and/or goods along a predetermined route. In the case where the autonomous vehicles 100 are intended for transportation of a shop, facility, or equipment, they may travel to a destination, and the shop, facility, or equipment may be prepared for operation at that place. The autonomous vehicles 100 may be vehicles that patrol on the road for the purpose of monitoring facilities and/or infrastructures or preventing crimes. In that case, the autonomous vehicles 100 may be configured to travel along a predetermined patrol route. The autonomous vehicles 100 that are powered by a battery are also called electric vehicle palettes (EV palettes).

Figure 1:
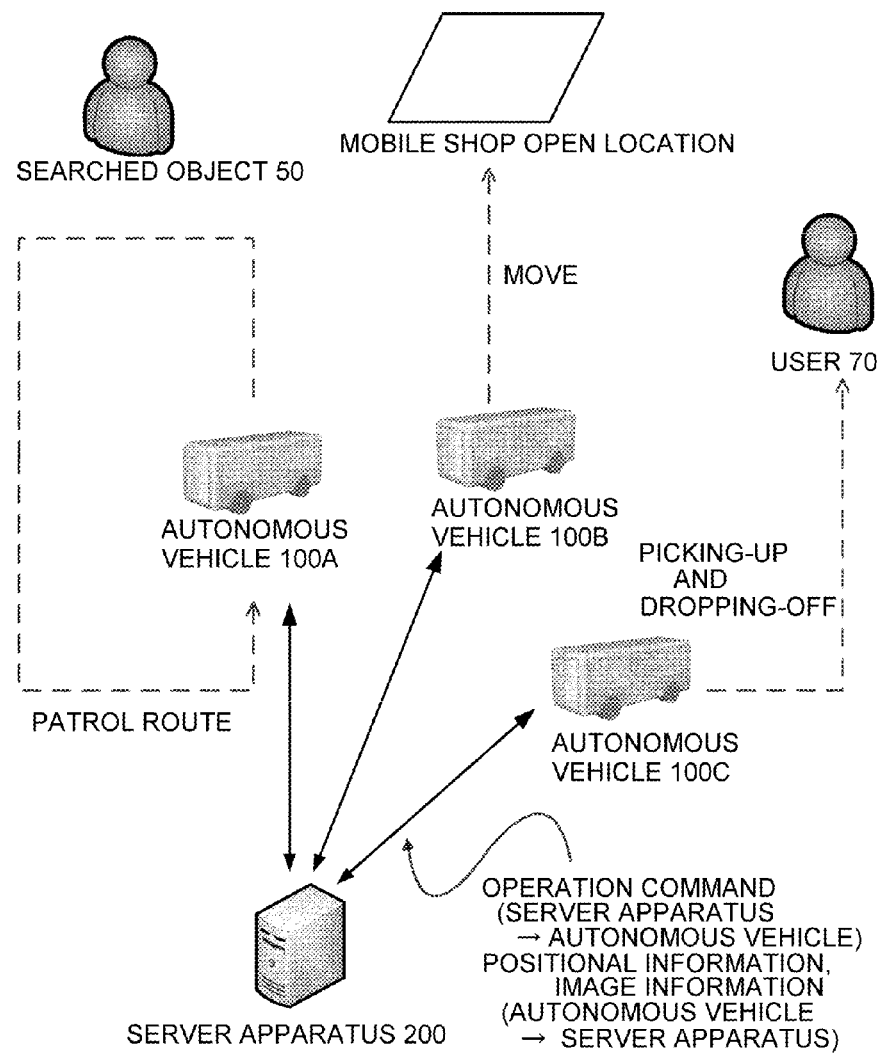
FIG. 1 is a diagram showing the general configuration of a person search system according to a first embodiment.

In the case shown in FIG. 1, the autonomous vehicle 100A is a monitoring vehicle that travels along a predetermined patrol route, the autonomous vehicle 100B is a vehicle used to open a mobile shop at a certain location, and the autonomous vehicle 100C is an on-demand taxi that picks up and dropping off a user 70. A searched object 50 shown in FIG. 1 will be described later.

The autonomous vehicles 100 are not required to be vehicles without humans. For example, a sales staff(s), a customer service attendant(s), or an operation monitoring crew(s) may be aboard the autonomous vehicle 100. The autonomous vehicles 100 are not required to be vehicles that can run completely autonomously. For example, they may be vehicles that can be driven by a human driver or accept a human assistance in some circumstances.

Moreover, the autonomous vehicles 100 have the functions of receiving requests by users, responding to the users, performing appropriate processing in response to the users' requests, and reporting the result of processing to the users. The autonomous vehicles 100 may transfer the requests by users that they cannot fulfil by themselves to the server apparatus 200 so as to fulfil them in cooperation with the server apparatus 200.

The server apparatus 200 is an apparatus that directs the operation of the autonomous vehicles 100. For example, in the case where an EV palette is used as an on-demand taxi, the server apparatus 200 receives a request by a user 70 to get a location to which an autonomous vehicle 100 is to be dispatched and the user's destination. Then, the server apparatus 200 sends to an autonomous vehicle 100 that is running in the neighborhood of the requested location an operation command to the effect that the autonomous vehicle 100 is to transport a person(s) from the place of departure to the destination with positional information and information specifying the user 70. The server apparatus 200 may also send to the autonomous vehicle 100A, which serves as a monitoring vehicle, an operation command to the effect that the autonomous vehicle 100A is to monitor streets while travelling along a predetermined route. Moreover, the server apparatus 200 may send to the autonomous vehicle 100B, which is used as a mobile shop, a command to the effect that the autonomous vehicle 100B is to travel to a specific destination to open a shop at that place. As above, operation commands may specify operations to be done by autonomous vehicles 100 besides traveling.

The person search system according to the first embodiment also has the function of collecting images by the autonomous vehicles 100 in order for the server apparatus 200 to detect a wanderer or a lost child. For this purpose, the autonomous vehicles 100 capture images of their environment by means of imaging means and send the images to the server apparatus 200. Positional information acquired by a GPS device associated with the images may be also sent to the server apparatus 200. The server apparatus 200 detects a wanderer or a lost child using the images received from the autonomous vehicles 100.

<System Configuration>

Figure 2:
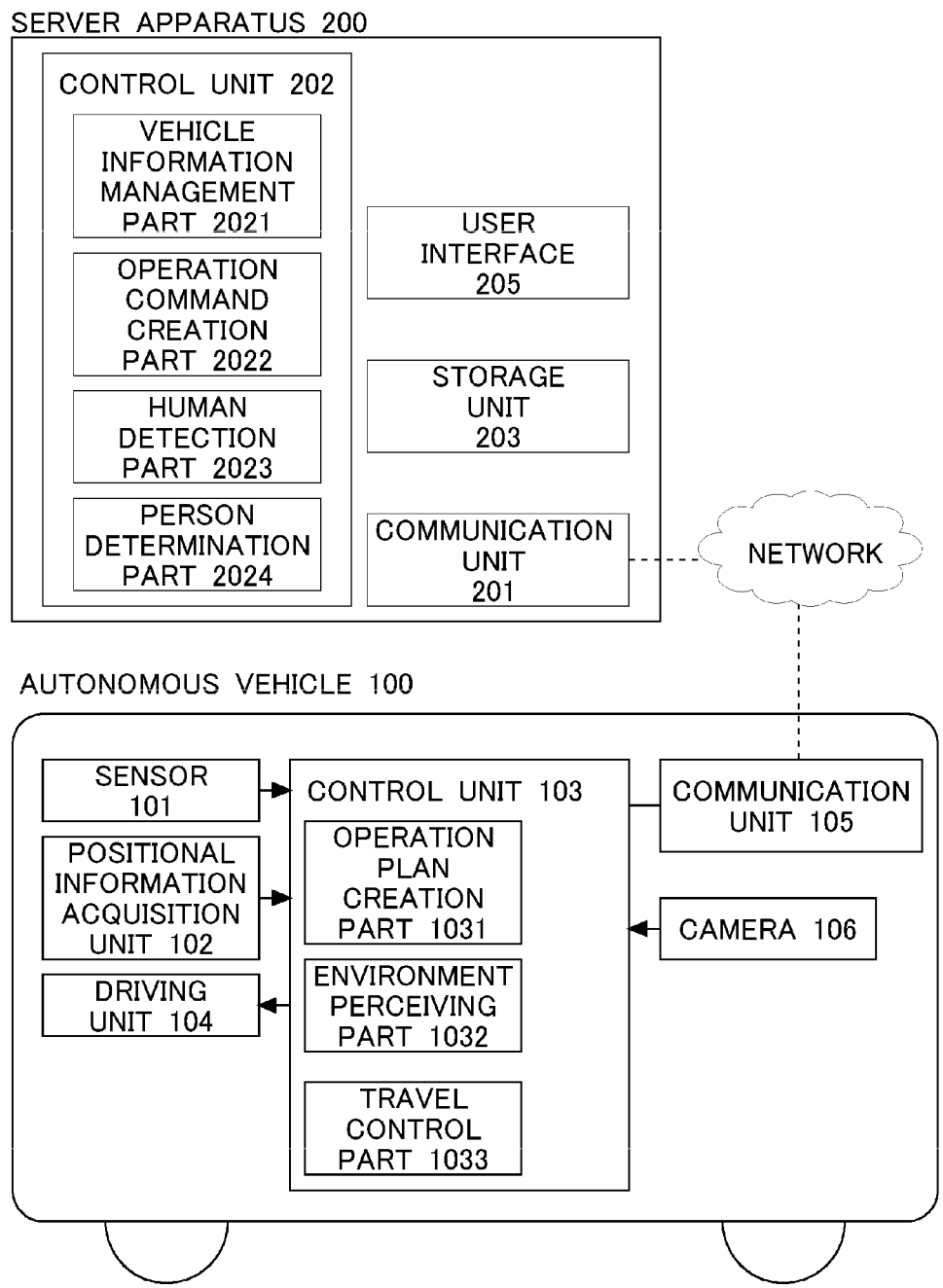
FIG. 2 is a block diagram showing components of the person search system.

FIG. 2 is a block diagram showing an example of the configuration of the autonomous vehicle 100 and the server apparatus 200 shown in FIG. 1.

Autonomous Vehicle

The autonomous vehicle 100 is a vehicle that runs according to a command received from the server apparatus 200.

Specifically, the autonomous vehicle 100 creates a traveling route on the basis of the operation command received by wireless communication and travels on the road in an appropriate manner while sensing its environment.

The autonomous vehicle 100 has a sensor 101, a positional information acquisition unit 102, a control unit 103, a driving unit 104, a communication unit 105, and a camera 106. The autonomous vehicle 100 operates by electrical power supplied by a battery, which is not shown in the drawings.

The sensor 101 is means for sensing the environment of the vehicle, which typically includes a stereo camera, a laser scanner, LIDAR, radar, or the like. Information acquired by the sensor 101 is sent to the control unit 103.

The positional information acquisition unit 102 is means for acquiring the current position of the vehicle. The positional information acquisition unit 102 includes a GPS receiver, which receives a GPS signals from GPS satellites to acquire positional information (e.g. latitude, longitude, and altitude) on the basis of time information. Information acquired by the positional information acquisition unit 102 is sent to the control unit 103.

The control unit 103 is a computer that controls the autonomous vehicle 100 on the basis of the information acquired through the sensor 101. The control unit 103 is, for example, a microcomputer. The control unit 103 includes as functional modules an operation plan creation part 1031, an environment perceiving part 1032, and a travel control part 1033. These functional modules may be implemented by executing programs stored in storage means, such as a read only memory (ROM), by a central processing unit (CPU), neither of which is shown in the drawings.

The operation plan creation part 1031 receives an operation command from the server apparatus 200 and creates an operation plan of the vehicle. In this embodiment, the operation plan is data that specifies a route along which the autonomous vehicle 100 is to travel and a task(s) to be done by the autonomous vehicle 100 in a part or the entirety of that route. Examples of data included in the operation plan are as follows:

(1) Data that Specifies a Route Along which the Vehicle is to Travel by a Set of Road Links The route along which the vehicle is to travel may be created automatically from a given place of departure and a given destination with reference to map data stored in the storage means (not shown). Alternatively, the route may be created using an external service.

(2) Data that Specifies a Task(s) to be Done by the Vehicle at a Certain Location(s) in the Route Examples of the tasks to be done by the vehicle include, but are not limited to, picking up and dropping off a person(s), loading and unloading goods, opening and closing a mobile shop, and collecting data.

The operation plan created by the operation plan creation part 1031 is sent to the travel control part 1033, which will be described later.

The environment perceiving part 1032 perceives the environment around the vehicle using the data acquired by the sensor 101. What is perceived includes, but is not limited to, the number and the position of lanes, the number and the position of other vehicles present around the vehicle, the number and the position of obstacles (e.g. pedestrians, bicycles, structures, and buildings) present around the vehicle, the structure of the road, and road signs. What is perceived may include anything that is useful for autonomous traveling.

The environment perceiving part 1032 may track a perceived object(s). For example, the environment perceiving part 1032 may calculate the relative speed of the object from the difference between the coordinates of the object determined in a previous step and the current coordinates of the object.

The data relating to the environment acquired by the environment perceiving part 1032 is sent to the travel control part 1033, which will be described below. This data will be hereinafter referred to as "environment data".

The travel control part 1033 controls the traveling of the vehicle on the basis of the operation plan created by the operation plan creation part 1031, the environment data acquired by the environment perceiving part 1032, and the positional information of the vehicle acquired by the positional information acquisition unit 102. For example, the travel control part 1033 causes the vehicle to travel along a specific route in such a way that obstacles will not enter a specific safety zone around the vehicle. A known autonomous driving method may be employed to drive the vehicle. The control of the vehicle may include locking and unlocking of the door and turning-on and turning-off of the engine.

The driving unit 104 is means for driving the autonomous vehicle 100 according to a command issued by the travel control part 1033. The driving unit 104 includes, for example, a motor and inverter for driving wheels, a brake, a steering system, and a secondary battery.

The communication unit 105 serves as communication means for connecting the autonomous vehicle 100 to a network. In this embodiment, the communication unit can communicate with other devices (e.g. the server apparatus 200) via a network using a mobile communication service based on e.g. 3G or LTE. The communication unit 105 may further include communication means for inter-vehicle communication with other autonomous vehicles 100.

The camera 106 is an on-vehicle camera provided on the body of the autonomous vehicle 100. As the camera 106, an imaging device using an image sensor such as a charge-coupled device (CCD), metal oxide semiconductor (MOS), or complementary metal oxide semiconductor (CMOS) sensor may be employed.

Figure 3:
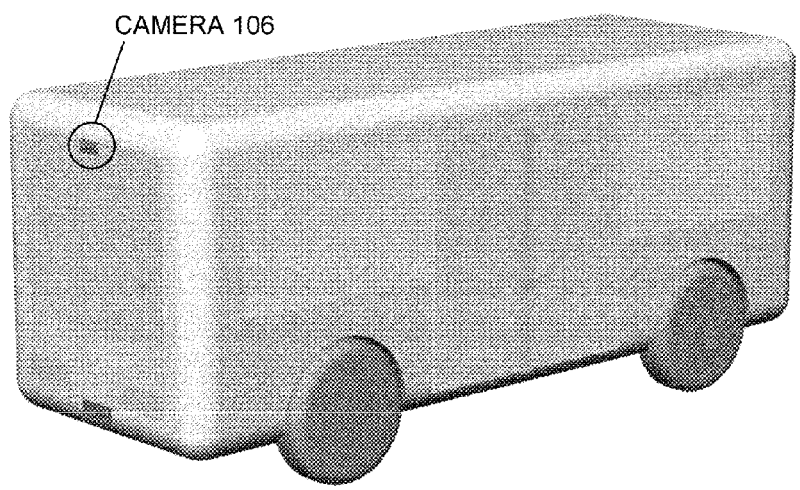
FIG. 3 shows the outer appearance of an autonomous vehicle.

FIG. 3 shows the outer appearance of the autonomous vehicle 100. As shown in FIG. 3, the autonomous vehicle 100 according to this embodiment has the on-vehicle camera 106, which can capture images (still images or moving images). The camera 106 may be a visible light camera or an infrared camera. While FIG. 3 shows only one camera, the autonomous vehicle 100 may have a plurality of cameras 106 provided on different portions of the vehicle body. For example, cameras may be provided on the front, rear, and right and left sides of the vehicle body. Image capturing by the camera may be performed either in response to an image capturing command sent from the server apparatus 200 or periodically at regular intervals. In the following, the term "searched object" will be used to refer to an object to be searched for by the person search system using the autonomous vehicles 100. The searched object includes a human being, such as a wanderer or a lost person. The searched object may be a creature, such as a pet in some cases.

Server Apparatus

Next, the server apparatus 200 will be described.

The server apparatus 200 is configured to manage the position of the running autonomous vehicles 100 and send operation commands to them. For example, when the server apparatus 200 receives a request for dispatching a taxi from a user, the server apparatus 200 is notified of the place of departure and the destination and sends an operation command to an autonomous vehicle 100 that is capable of serving as a taxi and running in the neighborhood of the place of departure.

The server apparatus 200 has a communication unit 201, a control unit 202, a storage unit 203, and a user interface 205.

The communication unit 201 is a communication interface for communication with autonomous vehicles 100 via a network, as with the communication unit 105 of the autonomous vehicle 100.

The control unit 202 is means for performing overall control of the server apparatus 200. The control unit 202 is constituted by, for example, a CPU.

The control unit 202 includes as functional modules a vehicle information management part 2021, an operation command creation part 2022, a human detection part 2023, and a person determination part 2024. These functional modules may be implemented by executing programs stored in storage means, such as a read only memory (ROM), by the CPU, neither of which is shown in the drawings.

The user interface 205 is input means through which a user can input information. The user interface 205 includes a display device that displays images, such as a liquid crystal display or an organic electro-luminescence display and an input device, such as a mouse and/or a keyboard.

The vehicle information management part 2021 manages a plurality of autonomous vehicles 100 that are under its management. Specifically, for example, the vehicle information management part 2021 receives positional information from the autonomous vehicles 100 at predetermined intervals and stores the information in association with the date and time in the storage unit 203, which will be described later. Moreover, the vehicle information management part 2021 holds and updates data about features of the autonomous vehicles 100, if necessary. This data will be hereinafter referred to as "vehicle information". Examples of the vehicle information include, but are not limited to, the identification of each autonomous vehicle 100, the service type, information about the location at which each vehicle is on standby (e.g. car shed or service office), the door type, the vehicle body size, the carrying capacity, the maximum number of passengers, the full charge driving range, the present (or remaining) driving range, and the present status (such as empty, occupied, running, or under operation etc.).

When a request for operation of an autonomous vehicle 100 is received from outside, the operation command creation part 2022 determines the autonomous vehicle 100 to be dispatched and creates an operation command according to the request for operation. Examples of the request for operation are, but not limited to, as follows:
(1) Request for Transportation of Passengers or Goods
This is a request for transportation of a passenger(s) or goods with designation of a place of departure and a destination or a route to be followed.
(2) Request for Dispatch of an Autonomous Vehicle Having a Specific Function
This is a request for dispatch of an autonomous vehicle 100 that is capable of functioning as a shop (e.g. eating house, sales booth, or showcase), an office of a business entity (e.g. private office or service office), or a public facility (e.g. branch of a city office, library, or clinic). The place to which an autonomous vehicle 100 is to be dispatched may be either a single place or multiple places. In the case of multiple places, a service may be provided at each of the places.
(3) Request for Patrol on the Road
This is a request for patrol on the road for the purpose of monitoring facilities and/or infrastructures or preventing crimes.

Requests for operation are received from users via, for example, a network. The sender of a request for operation is not necessarily an ordinary user. For example, the organization that provides the service with the autonomous vehicles 100 may send a request for operation.

The autonomous vehicle 100 to which an operation command is to be sent is determined taking account of the positional information of the vehicles and the vehicle information (indicating what function each vehicle has) that the vehicle information management part 2021 has received.

The human detection part 2023 analyzes images received from the autonomous vehicles 100 under operation according to operation commands to detect the presence of humans in the images. Human detection may be carried out using existing technologies. For example, in the case where the face portion of humans is to be detected, examples of the method employed include extracting specific shape patterns such as front views and side views of faces by template processing, detecting colors typical of human skins, detecting brightness edge information, and detecting motions typical of human faces. Detecting the face portion is advantageous for identification of persons. Another method that can be employed is comparing a plurality of frames in a moving image (video) to extract a moving area therein and detecting a human image on the basis of the shape and motion of the moving area. Alternatively, other image processing technologies, such as tracking and optical flow may be employed. Humans may be detected on the basis of portions of humans other than the face, clothes, or something that people carry.

The human detection part 2023 stores detected human images in the storage unit 203 or sends them to the person determination part 2024. The human image may be associated with positional information and a time stamp indicating the time of image capturing. The human images may be converted into features, which can reduce the data size and data transfer time.

The person determination part 2024 determines whether or not the human image detected by the human detection part 2023 is an image of a searched object that satisfies a specific search condition. The search condition is a condition that is set to make a determination as to whether the person of the human image is a searched object. Examples of the search condition are as follows:
(1) Matching of Features of the Human Image with Features of a Searched Object Stored in the Storage Unit 203.

In the case where this search condition is used, the server apparatus 200 receives information about a wanderer or a lost child from an external apparatus (not shown) and stores it in the storage unit 203 in advance. An example of the external apparatus is a server through which information about a missing person is distributed by an organization, such as the police, local government, hospital, school, lost child center, or news organization. The person determination part 2024 compares the information stored in the storage unit 203 and the information output from the human detection part 2023, and if the degree of matching in features exceeds a predetermined threshold, the person determination part 2024 determines that the detected person is the searched object.

(2) Matching of the Behavior of the Detected Person with Features of a Searched Object Stored in the Storage Unit 203.

In the case where the information received from the aforementioned external apparatus includes detailed information about a wanderer (e.g. information about patterns of his/her behavior and/or the address of his/her present or previous residence and/or workplace), the place where he or she tends to appear or a route along which he or she tends to follow may be conjectured in some cases.

(3) Matching of the Behavior of the Detected Person with a Pattern of Behavior Typical of a Wanderer or the Like This search condition is used in searching for wanderers or lost children from a large amount of image data instead of searching for a specific person as in the above cases (1) and (2). This search condition can be used in the case where a moving image or a plurality of still images containing the same person captured at different times are available. Since wanderers or lost children show specific patterns of behavior in some cases, the person determination part 2024 is configured to determine that the detected person is a searched object if such a specific pattern of behavior is found.

Specifically, if two images contain the same person, that person is extracted from other images using tracking or other methods to acquire a pattern of behavior of that person. Examples of such specific patterns of behavior are as follows:
  appearing at the same place recurrently because of losing the way;
  moving at low speed or staying at one place for a long time (reasonable staying at an appropriate place, such as a bus stop, is excluded);
  incomprehensible behavior, such as walking a mountain trail at night.

(4) Designation by User

The person determination part 2024 may determine that a person in an image is a searched object on the basis of a designation by a user through the user interface 205. In this case, the user finds the searched object in an image displayed on the display device and designates he or she using a mouse or keyboard.

Two or more of the above conditions may be employed in combination. Conditions other than the above may also be employed.

The storage unit 203 is means for storing information, which is constituted by a storage medium, such as a RAM, a magnetic disc, or a flash memory.

<Operations Under Normal Circumstances>

Figure 4:
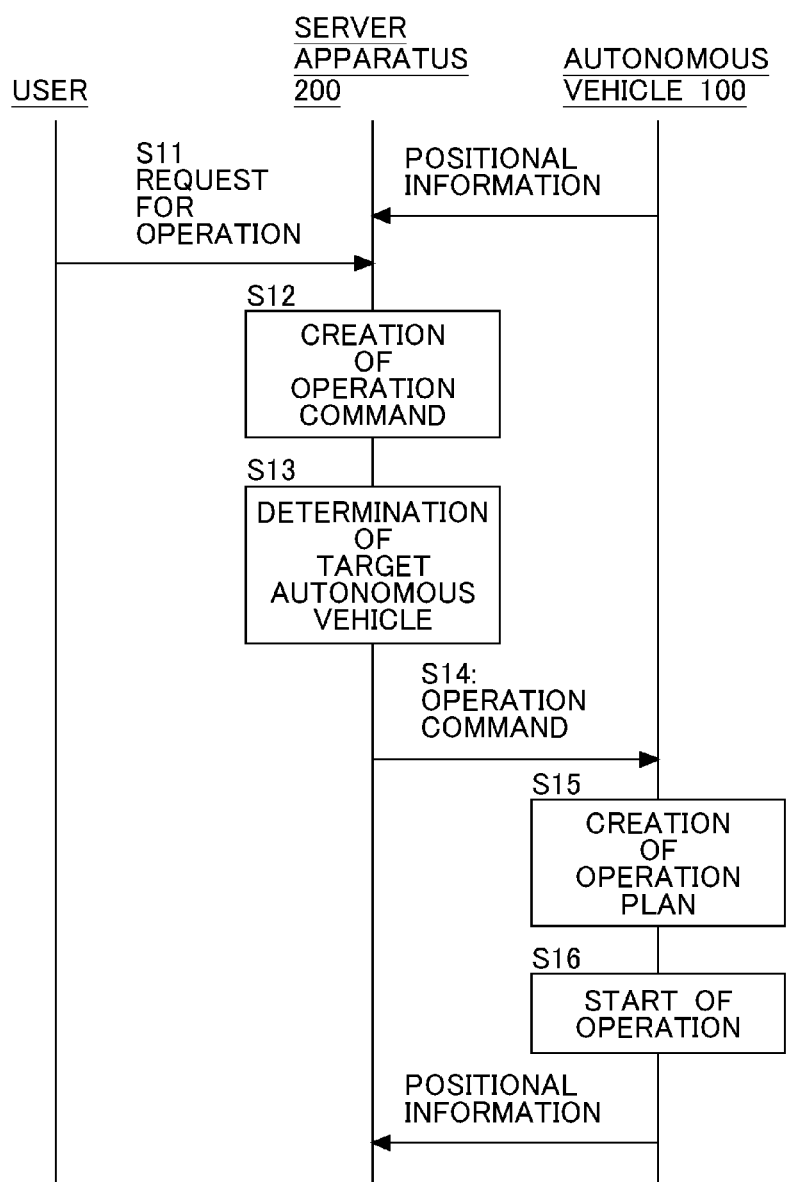
FIG. 4 is a diagram showing dataflow between the components of the system.

Processing that is performed by each of the above-described components will now be described. FIG. 4 is a diagram illustrating dataflow during a process in which the server apparatus 200 creates an operation command based on a request by a user and an autonomous vehicle 100 starts to operate. FIG. 4 shows a typical operation using an EV palette. Here, a case in which the autonomous vehicle 100 runs in a road network shown in FIG. 5 will be described by way of example.

The autonomous vehicle 100 sends positional information periodically to the server apparatus 200. For example, in the case shown in FIG. 5, the autonomous vehicle 100 informs the server apparatus 200 of its location at node A, and the vehicle information management part 2021 stores the association of the autonomous vehicle 100 with node A as data in the storage unit 203. The positional information is not necessarily positional information of a node itself. For example, the positional information may be information that specifies a node or link. A link may be divided into a plurality of sections. The road network is not necessarily a network represented by nodes and links. The positional information is updated every time the autonomous vehicle 100 moves.

If a user sends a request for operation to the server apparatus 200 by communication means (not shown) (step S11), the server apparatus 200 (specifically, the operation command creation part 2022) creates an operation command according to the request for operation (step S12). The operation command may designate a place of departure and a destination or only a destination. Alternatively, the operation command may designate a travel route. The operation command may include information about a task to be done or a service to be provided on the route. Here, a case in which a request for transportation of a person from node B to node C is made will be described.

Figure 5:
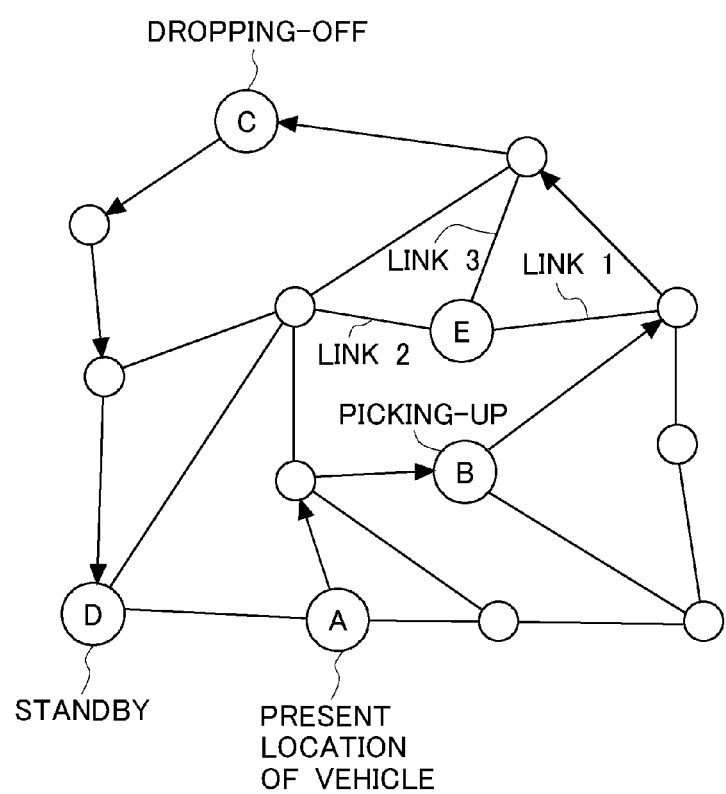
FIG. 5 is a diagram showing an exemplary road network.

In step S13, the operation command creation part 2022 selects an autonomous vehicle 100 that is to provide the service. For example, the operation command creation part 2022 determines an autonomous vehicle 100 that can provide the requested service and can be delivered to the user within a predetermined time, with reference to the stored positional information and vehicle information of the autonomous vehicles 100. Here, let us assume that the vehicle located at node A in FIG. 5 is selected. Consequently, the server apparatus 200 sends an operation command to the selected autonomous vehicle 100 (step S14).

In step S15, the autonomous vehicle 100 (specifically, the operation plan creation part 1031) creates an operation plan on the basis of the operation command it has received. In the case described here, for example, the autonomous vehicle 100 creates an operation plan to the effect that the autonomous vehicle 100 is to travel along the route indicated by the solid arrows in FIG. 5, pick up and drop off a person at node B and node C respectively, and return to node D. The operation plan thus created is sent to the travel control part 1033, and then the operation is started (step S16). Positional information is sent to the server apparatus 200 periodically during the operation also.

While in the above-described case the operation command is created on the basis of a request for operation sent from an external source (i.e. a user), the operation command does not necessarily have to be created on the basis of a request for operation sent from an external source. For example, the server apparatus 200 may create an operation command autonomously. Moreover, the creation of an operation plan does not necessarily have to be based on an operation command. For example, in cases where an autonomous vehicle 100 performs patrol for the purpose of surveying streets, the autonomous vehicle 100 may create an operation plan without receiving external instructions. Alternatively, an operation plan may be created by the server apparatus 200.

<Concrete Process>

In the following, an exemplary process specific to the system according to the present disclosure will be described with reference to FIG. 6 sometimes in comparison with the process shown in FIG. 4. This process relates to a case where a wanderer is searched for in response to an external request, and the aforementioned search condition (1) is applied. As in the case shown in FIG. 4, the server apparatus 200 creates an operation command in response to a request for operation sent from a user, though details of this process will not be described.

An organization, such as the police or local government, sends to the server apparatus 200 information about a wanderer (e.g. a pictures of his/her face and clothes and/or features based on them) (step S21). In step S22, in response to a request for operation (not shown), the server apparatus 200 creates a command to capture images of the vehicle's environment using the on-vehicle camera 106 as well as an operation command. Before determining a target vehicle(s) in step S23, the server apparatus 200 may narrow down the area in which the wanderer is expected to be located. The narrowing-down of the area may be performed using the information received from the aforementioned organization. In this connection, in the case where the wanderer carries a portable terminal (e.g. smartphone) that can transmit positional information, the positional information of that terminal may be used.

Then, the server apparatus 200 sends the operation command including the command to capture images created as above to an autonomous vehicle(s) 100 (step S24). As shown in FIG. 6, the operation command may be sent to a plurality of autonomous vehicles 100 simultaneously. In the case where the autonomous vehicle 100 is already operating according to an operation command, only the command to capture images may be sent to it. The command to capture images may specify the timing and cycle of image-capturing and designate either moving or still image.

The autonomous vehicle 100A or 100B having received the operation command creates an operation plan to start the operation (steps S25 and S26) and captures images using the camera 106 (step S27). Then, the autonomous vehicle 100A or 100B sends the captured images to the server apparatus 200 with positional information.

The server apparatus 200 performs human detection processing by the human detection part 2023 to detect a human image (step S28). Then, the server apparatus 200 performs person determination processing by the person determination part 2024 to determine whether or not the detected human image is an image of the searched object (step S29). If a person that matches the information about the wanderer sent from the organization is found, the image captured by the camera 106 is sent to the organization with positional information associated with the image (step S210).

As above, the system according to this embodiment can detect a searched object, such as a wanderer or lost child, using images captured by the camera 106 of the autonomous vehicles 100 under operation. Thus, the searched object can be found quickly. Since each autonomous vehicle 100 is required only to send images captured by the on-vehicle camera, the autonomous vehicle 100 does not need to suspend its operation according to a operation command.

Second Embodiment

The system according to the second embodiment searches for a searched object and gives protection to the searched object on the basis of the result of person determination made by the server apparatus 200. In the following description, the components same as those in the first embodiment will be denoted by the same reference signs to simplify the description. The control unit 202 of the server apparatus according to the second embodiment has discovery command creation means and protection command creation means, which will be described later. The discovery command creation means and the protection command creation means are functional modules similar to the vehicle information management part 2021 etc.

Figure 7:
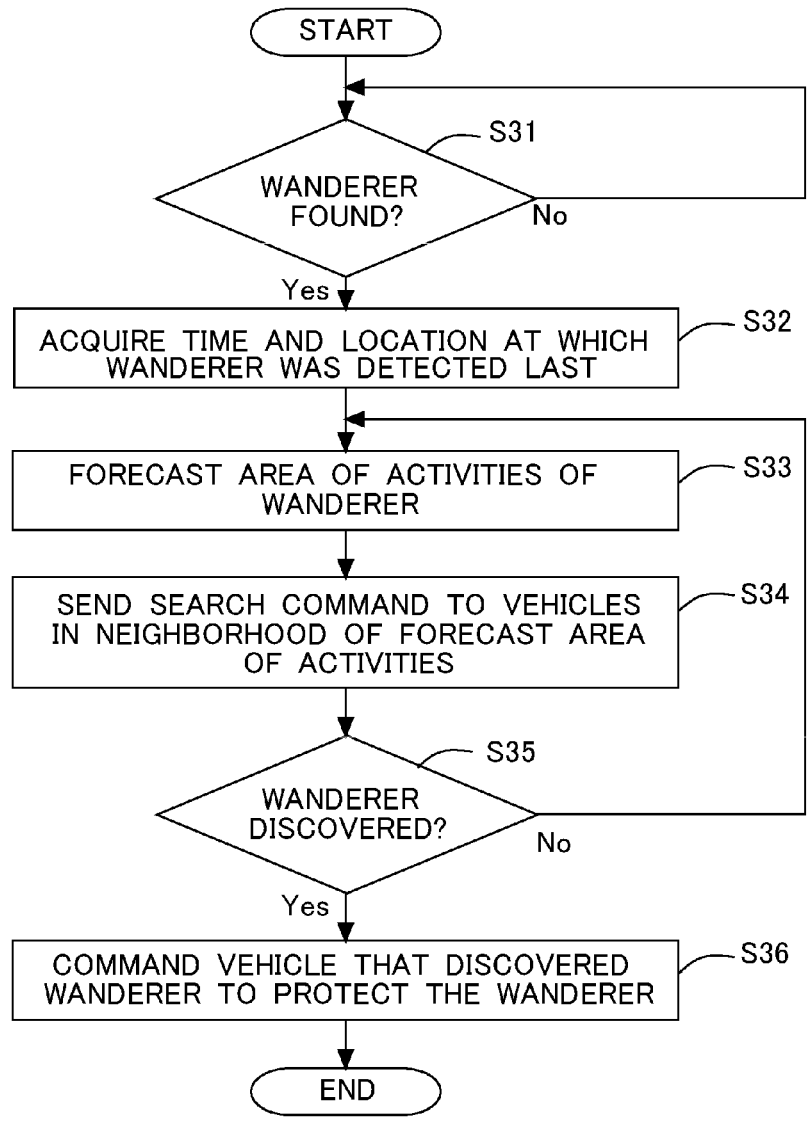
FIG. 7 is a flow chart of a process of protecting a searched object according to a second embodiment.

FIG. 7 is a flow chart of an exemplary process according to the second embodiment. This process is executed by the server apparatus 200 after the end of the process according to the first embodiment. The process shown in FIG. 7 may be executed repeatedly at regular intervals. In the following description, the searched object in the following description is assumed to be a wanderer for whom search is requested by an external organization.

Figure 6:
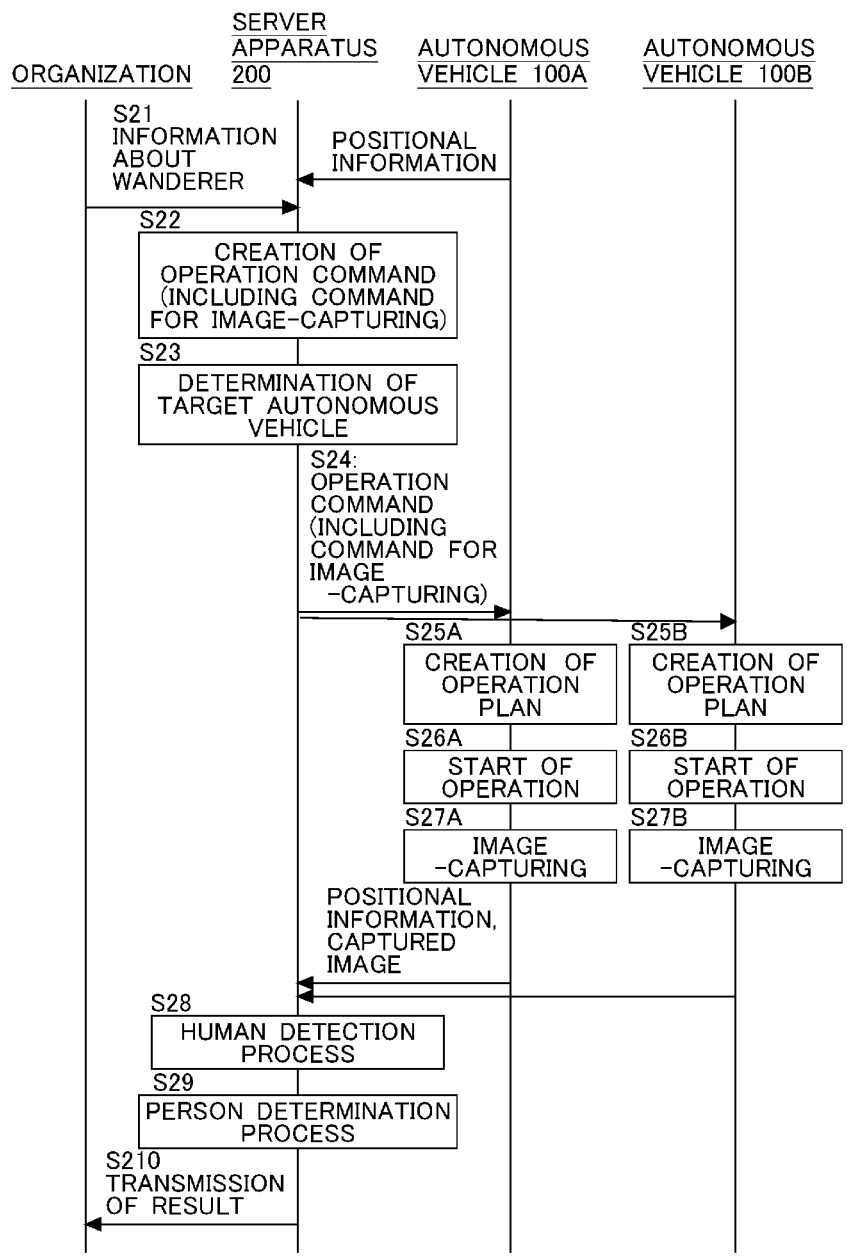
FIG. 6 is a flow chart of a person search process according to the first embodiment.

In step S31, the server apparatus 200 judges whether or not the wanderer has been found in images captured by the autonomous vehicles, on the basis of the result of the person determination processing (S29 in FIG. 6). If the wanderer has been found (Yes in S31), the server apparatus 200 determines the time at which the wanderer was detected last on the basis of the image capturing time of the images stored in the storage unit 203. Moreover, the server apparatus acquires positional information representing the location of capturing of the image in which the wanderer was detected last (step S32). If the wanderer has not been found (No in S31), the server apparatus 200 continues to judge whether or not the wanderer has been found in images captured by the autonomous vehicles.

In step S33, the server apparatus 200 forecasts the area of activities of the wanderer on the basis of the time and location at which he or she was detected last. In cases where the same person has been detected multiple times, the forecast may be made taking account of the direction and the speed of movement of the wanderer. Then, the discovery command creation means sends a new operation command for discovering the wanderer to an autonomous vehicle(s) 100 located in or in the neighborhood of the forecast area of activities of the wanderer (step S34). When creating the command for discovery, the discovery command creation means may communicate with the autonomous vehicles 100 through the communication unit 201 to ask the autonomous vehicles 100 whether they can conduct search and assign search areas to the autonomous vehicles 100 that have answered in the affirmative according to their locations.

The command for discovery specifies an area of movement or route of movement over or along which search is to be conducted. The command for discovery may include a command to make the frequency of image capturing by the camera 106 higher than usual. Consequently, image capturing will be conducted thoroughly over the forecast area of activities of the wanderer, leading to quick discovery.

In step S35, the human detection part 2023 and the person determination part 2024 of the server apparatus 200 determines whether or not the wanderer has been discovered on the basis of the images received from the autonomous vehicles 100. If it is determined that the wanderer has been discovered in S35 (Yes in S35), the process proceeds to step S36. If it is determined that the wanderer has not been discovered in S35 (No in S35), the process returns to step S33. In step S36, the protection command creation means commands the autonomous vehicle 100 that discovered the wanderer to move to the vicinity of the wanderer and to give protection to the wanderer. An example of the protection is inviting the wanderer to get on the autonomous vehicle 100 using a speaker or a display (not shown) of the autonomous vehicle 100 and transporting the wanderer to his or her home. In order not to arouse the wanderer's suspicion, the voice or image of a member of the wanderer's family or an acquaintance of the wanderer may be used in the aforementioned invitation. The autonomous vehicle 100 that discovered the wanderer may pursue the wanderer so as not to lose sight of him/her and/or communicate with another vehicle in the neighborhood to transfer the task of watching the wanderer to that vehicle. The autonomous vehicle 100 that discovered the wanderer may ask a policeman or the like in the vicinity of the wanderer for support.

As above, the system according to the second embodiment can give protection to the discovered wanderer by an autonomous vehicle 100. Moreover, a large number of autonomous vehicles 100 can be employed to search for or watch the wanderer. This enables quick discovery and protection of the wanderer.

Modifications

The modes and components of the present disclosure are not limited to those described above. Various modifications may be made to the above embodiments as described below.

In cases where the control unit 103 of the autonomous vehicle 100 has sufficient information processing capability, a plurality of autonomous vehicles cooperating with each other may replace the server apparatus 200 in the above-described embodiments to manage the system. In that case, one of the autonomous vehicles 100 may be configured to create operation commands. Alternatively, the autonomous vehicle 100 that serves as the director may be changed over according to the type of operation. In other words, the person search system according to the present disclosure can be constructed if at least one component of the system has the function of detecting a wanderer or the like on the basis of images captured by the autonomous vehicles 100.

Some of the functions of the server apparatus 200 in each embodiment may be provided by the autonomous vehicle 100. For example, detection of humans in images captured by the on-vehicle camera and person determination may be performed by the control unit of the autonomous vehicle 100. In that case, the autonomous vehicle 100 can identify a wanderer without communicating with the server apparatus 200. This enables quick discovery and leads to a reduction in the communication traffic.

What is claimed is:

1. An object search system comprising:
A first autonomous vehicle that has a camera for capturing an image and a GPS receiver for acquiring positional information;
a second autonomous vehicle; and
a server including a controller configured to:
receive the image and a location of the first autonomous vehicle at a time of capturing the image from the first autonomous vehicle;
detect a human image in said image;
make a determination as to whether or not said human image detected in said image corresponds to an image of an object;
predict an area of activities of the object based on the location of the first autonomous vehicle and the time of capturing the image in response to determination that said human image corresponds to the image of the object; and
command the second autonomous vehicle to move to the area of activities and discover the object.

2. The object search system according to claim 1, further comprising a non-transitory storage medium, wherein said controller is further configured to make said determination on the basis of information about said object stored in said non-transitory storage medium and said image.

3. The object search system according to claim 1, wherein said controller is further configured to detect said human image in each of a plurality of images, and said controller is further configured to make said determination on the basis of a plurality of human images that are images of a same person.

4. The object search system according to claim 1, further comprising a user interface, wherein said controller is further configured to make said determination on the basis of an input made through said user interface.

5. The object search system according to claim 1, wherein said controller is further configured to command the second autonomous vehicle to give protection to a person corresponding to said human image that is determined to be an image of said object by said controller.

6. The object search system according to claim 5, wherein said second autonomous vehicle is further configured to give protection to said object by letting said object get on the second autonomous vehicle.

7. The object search system according to claim 1, wherein the system comprises a plurality of autonomous vehicles, and said controller is further configured to determine an area or route in or along which said autonomous vehicle is to travel to discover said object, on the basis of positional information of said plurality of autonomous vehicles.

8. The object search system according to claim 1, wherein information about said object is stored in the server.

* * * * *

UNITED STATES PATENT AND TRADEMARK OFFICE
CERTIFICATE OF CORRECTION

PATENT NO. : 10,824,863 B2
APPLICATION NO. : 16/225622
DATED : November 3, 2020
INVENTOR(S) : Isao Kanehara et al.

It is certified that error appears in the above-identified patent and that said Letters Patent is hereby corrected as shown below:

On the Title Page

Item (71), applicant, city, delete "Toyota" and insert --Toyota-shi Aichi-ken--, therefor.

Item (72), inventor 1, city, delete "Miyoshi" and insert --Miyoshi-shi, Aichi-ken--, therefor.

Item (72), inventor 2, city, delete "Nisshin" and insert --Nisshin-shi Aichi-ken--, therefor.

Item (72), inventor 3, city, delete "Nagoya" and insert --Nagoya-shi Aichi-ken--, therefor.

Item (72), inventor 4, city, delete "Toyota" and insert --Toyota-shi Aichi-ken--, therefor.

Item (72), inventor 5, city, delete "Tokyo" and insert --Minato-Ku Tokyo--, therefor.

Item (73), assignee, city, delete "Toyota" and insert --Toyota-shi Aichi-ken--, therefor.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*